US 8,250,052 B2
Aug. 21, 2012

(12) United States Patent
Barnett

(10) Patent No.: US 8,250,052 B2
(45) Date of Patent: Aug. 21, 2012

(54) GEOSPATIAL DATA INTERACTION

(75) Inventor: Robert Matthew Barnett, Houston, TX (US)

(73) Assignee: Continental Airlines, Inc., Houston, TX (US)

( * ) Notice: Subject to any disclaimer, the term of this patent is extended or adjusted under 35 U.S.C. 154(b) by 621 days.

(21) Appl. No.: 12/330,204

(22) Filed: Dec. 8, 2008

(65) Prior Publication Data

US 2010/0145979 A1    Jun. 10, 2010

(51) Int. Cl.
G06F 17/30    (2006.01)

(52) U.S. Cl. ......... 707/706; 707/713; 707/728; 707/760

(58) Field of Classification Search .................. 707/706, 707/767, 713, 728, 760; 709/223–224
See application file for complete search history.

(56) References Cited

U.S. PATENT DOCUMENTS

| | | | | |
|---|---|---|---|---|
| 7,281,000 B2 * | 10/2007 | Kapoor et al. | | 1/1 |
| 7,933,929 B1 * | 4/2011 | McClendon et al. | | 707/802 |
| 2001/0014888 A1 * | 8/2001 | Tsuchida et al. | | 707/2 |
| 2003/0212863 A1 * | 11/2003 | Ganguly et al. | | 711/118 |
| 2004/0044469 A1 * | 3/2004 | Bender et al. | | 701/208 |
| 2004/0085318 A1 * | 5/2004 | Hassler et al. | | 345/440 |
| 2004/0088346 A1 * | 5/2004 | Hassler et al. | | 709/201 |
| 2004/0103117 A1 * | 5/2004 | Segler | | 707/104.1 |
| 2006/0041599 A1 * | 2/2006 | Tsuchida et al. | | 707/200 |
| 2006/0047696 A1 * | 3/2006 | Larson et al. | | 707/103 R |
| 2006/0117299 A1 * | 6/2006 | Goldsmith et al. | | 717/124 |
| 2006/0190461 A1 * | 8/2006 | Schaefer | | 707/100 |
| 2006/0218129 A1 * | 9/2006 | Muras | | 707/3 |
| 2007/0050356 A1 * | 3/2007 | Amadio | | 707/5 |
| 2007/0136291 A1 * | 6/2007 | Bird et al. | | 707/9 |
| 2007/0198586 A1 * | 8/2007 | Hardy et al. | | 707/104.1 |
| 2007/0288526 A1 * | 12/2007 | Mankad et al. | | 707/200 |
| 2008/0052282 A1 * | 2/2008 | Muras | | 707/4 |
| 2008/0154866 A1 * | 6/2008 | Beyer et al. | | 707/3 |
| 2008/0226195 A1 * | 9/2008 | Martin | | 382/287 |
| 2008/0275880 A1 * | 11/2008 | Bird et al. | | 707/9 |
| 2009/0002367 A1 * | 1/2009 | Alexis | | 345/419 |
| 2009/0088183 A1 * | 4/2009 | Piersol et al. | | 455/456.1 |
| 2009/0319521 A1 * | 12/2009 | Groeneveld et al. | | 707/6 |
| 2010/0100540 A1 * | 4/2010 | Davis et al. | | 707/728 |
| 2010/0100548 A1 * | 4/2010 | Scott et al. | | 707/741 |
| 2010/0100835 A1 * | 4/2010 | Klaric et al. | | 715/765 |
| 2010/0185668 A1 * | 7/2010 | Murphy | | 707/771 |

* cited by examiner

*Primary Examiner* — Hanh Thai
(74) *Attorney, Agent, or Firm* — Wong, Cabello, Lutsch, Rutherford & Brucculeri LLP

(57) ABSTRACT

A method, system and medium for accepting geospatial data queries through an interface allowing dynamic predicates are disclosed. The geospatial data queries are translated into one or more intermediate formats, and then the intermediate format is provided to one or more geospatial data servers. Each of the one or more geospatial data servers will receive the appropriate language and syntax for which it was designed. Each of the one or more geospatial data servers will simultaneously process the request and, when processing is complete, render an appropriate result from that geospatial data server and application to an end user.

20 Claims, 2 Drawing Sheets

GEOSPATIAL DATA INTERACTION

BACKGROUND

This disclosure relates generally to methods and systems for a high level interface allowing users to express geovisualization requests in an intuitive manner without requiring a user to rely on pre-programmed "static" predicates. More particularly, but not by way of limitation, this disclosure relates to a method and system for abstracting interface functions and allowing "dynamic predicates" when interacting with a set of one or more geospatial data storage facilities. Thereby a user is able to obtain results from ad-hoc queries as opposed to pre-defined and programmed user interface filtering functions.

An important element of all data interrogation is the capability of filtering. A user can cull the dataset based on selection criteria to focus on a subset of the available information with the geovisualization server hiding extraneous data during analysis. Each geovisualization application typically has the capability to render data dynamically during a user session and apply filters against the dynamically changing data. However, in the prior art, the predicates are static in the sense that the requirement to apply the filter must be identified before a user session begins and programmed into the interface before runtime. Thus, dynamic predicates allow for redefining query structure and information without an end user requirement to initiate a new session or application process.

Because it may not always be possible for users to predict what kinds of filtering criteria they may be interested in before a session begins, many iterations of programmer and user interaction may be required to produce a desired view of the data.

Current user interfaces to geospatial storage facilities and databases in general utilize static predicates. The use of static predicates requires a programmer to pre-define filtering functions into a user interface and does not allow for the more flexible ad-hoc queries that may be achieved with dynamic predicates.

Worldwide corporations, for example, airlines and freight carriers, typically collect and retain a variety of information with a geospatial context (e.g. aircraft location, truck location, package location, customer data and route information). A geographic information system (GIS) is a system for capturing, storing, analyzing and managing data and associated attributes which are spatially referenced to Earth. GIS technology can be used for many things including, scientific investigations, resource management, asset management, environmental impact assessment, urban planning, cartography, sales, marketing and logistics.

Geospatial computer applications such as Google Earth (available from Google incorporated), NASA World Wind (available from the National Aeronautics and Space Administration), and Microsoft Windows Live Maps (available from Microsoft incorporated), among others, allow for access to geovisualization of information by use of specific data interrogation techniques. While these data interrogation techniques provide for some flexibility, they are mostly limited in the realm of filtering because they use predefined predicates. However, iterative refinement of filtering during a session by means of dynamic predicates allows a more flexible and analytic potential because it allows for more flexible ad-hoc queries by a user. In general, dynamic predicates allow a user to invent new questions in the form of queries for information.

In the prior art, a user interface typically has the restriction imposed on filtering by predefined static predicates. That is to say that a query takes the form "what are the flight paths of all the aircraft departing or arriving from cities AAA over the time period XXX to YYY?" Note that a user is therefore restricted to simply requesting information by filling in variables at pre-defined locations in the query.

In contrast to static predicates of the prior art, a dynamic predicate is not confined to a single prescribed form, but instead, may draw upon and combine properties from accessible data to form an ad hoc question. For example, if some of the properties of available data were "city," "flight paths," and "time" then an embodiment of a dynamic predicate would involve some logical arrangement of those properties in question form such as "what are the flight paths of all the aircraft departing or arriving from cities AAA over the time period XXX to YYY" or alternatively "what are the flight paths of all the aircraft departing or arriving from cities AAA not before XXX" or many other conceivable, but not predefined, forms. With dynamic predicates a user is able to alter the request in a more flexible manner without having to stop and start the session or re-enter the entire and possibly complex query A useful analogy for contrasting static and dynamic predicates would be as two differing strategies for the creation of poetry. In the case of static predicates, a strict "poem template" would be provided along with a series of specific choices to fill in gaps in the template. For example: "Roses are (red/crimson), violets are (blue/cobalt)." Here only four possible poems exist, all starting with the word "Roses." Alternatively, a set of words could be provided {"roses", "violets", "are", "is", "red", "crimson", "blue", "cobalt"} along with the restriction "construct only arrangements of the given words that form grammatically valid sentences." As such, many differing poems could be constructed such as "Roses are crimson, violets are blue" or "Crimson is red, cobalt is blue," among many others. Static predicates are analogous to the former strategy while dynamic predicates are similar to the latter.

The Analytical Geoquery Language (AGL) described herein provides for dynamic predicates by defining the vocabulary, mechanisms for the creation of new vocabulary, and the grammatical rules that govern the structure of a "valid" sentence. Standardizing on a common high level interface for expressing queries with geospatially significant results intended for rendering in geovisualization systems allows for abstracting away specific details of the visualization layer's data injection technique. A user need not be bothered with the details of programming languages such as Keyhole Markup Language (KML) or Jscript (a programming language developed by Microsoft) when incorporating visualization capability, but instead may focus on the logical relationships within the data itself. Furthermore, because the AGL input is not tied to any specific geovisualization server or underlying programming language, a user is not bound to information residing in a particular data repository or a specific geovisualization implementation. In one embodiment a single input of an AGL query will produce a similar result in several different geovisualization software packages simultaneously.

SUMMARY

Disclosed herein are methods and systems for interpreting a geospatial query which results in a geovisualization of data as a result of the query. The query can be accepted as a user input from a user interface configured to accept dynamic predicates. Dynamic predicates differ from static predicates in that, among other things, they allow the user to refine the results in essence by defining filters on the fly. After the user input is accepted, the request for geospatial information is translated into an intermediate data format acceptable as input to one or more geoserver applications. In one embodiment external data sources can be further queried in concert with this translation thus providing a user access to multiple data sources concurrently. After the data is translated, the applicable portion can be sent to one or more geoservers to obtain the result of the user query. In one embodiment, the geovisualization server may directly provide the rendering of the result. In another, the result can be returned to the translating adapter for further processing prior to rendering.

DETAILED DESCRIPTION

Figure 1:
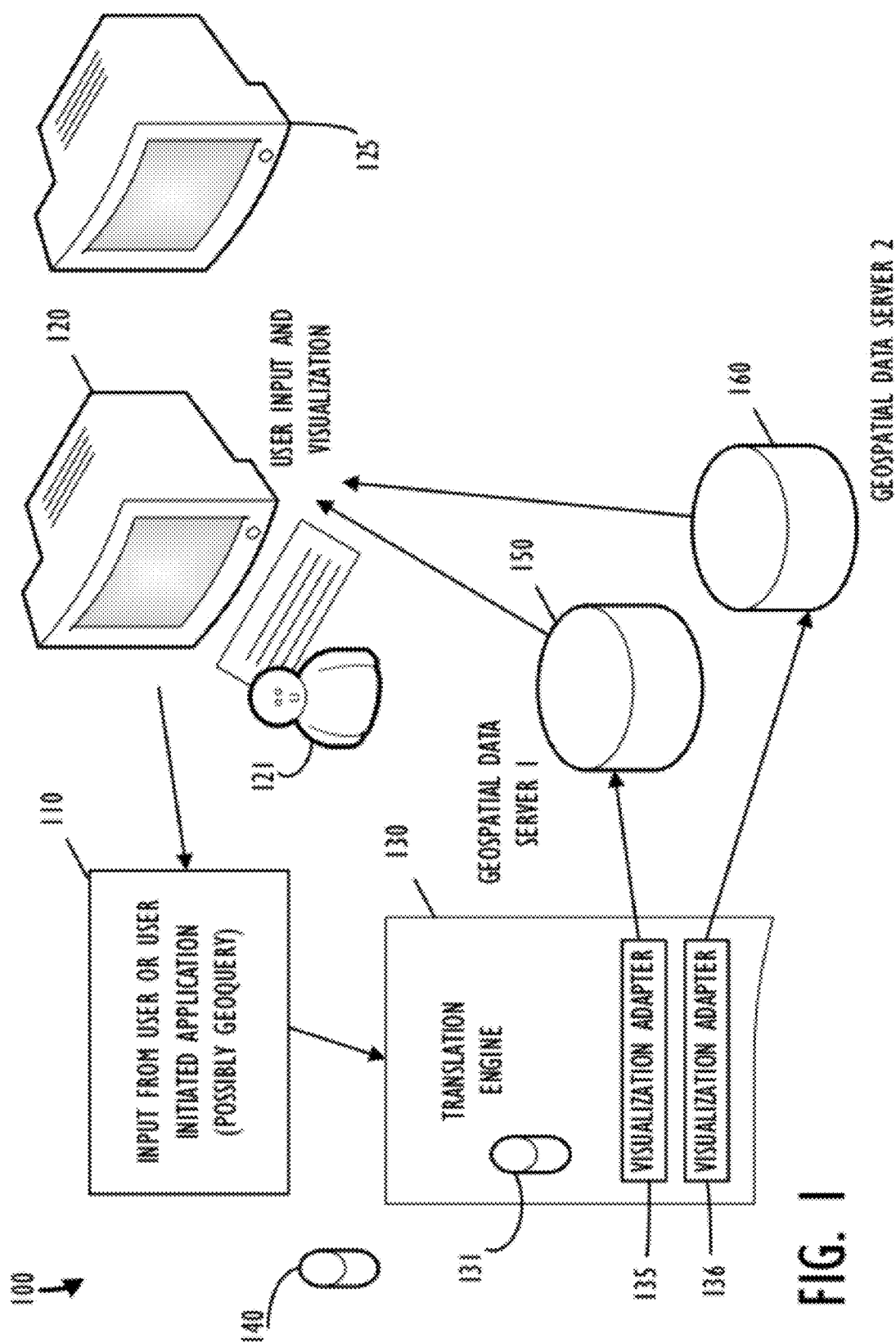
FIG. 1 shows an illustrative architecture to support a geospatial query.

To aid in the understanding of this disclosure the following definitions are provided:

Analytical Geoquery Language (AGL): A language used to express a series of steps for creating a geovisualization, analysis, and or general computation.

AGL Interpreter: A computer program that takes as input a valid AGL program and produces the (possibly geovisual) result of that program.

AGL Program: A syntactically and semantically correct set of statements to perform a function using AGL.

Geo: Earth

Geovisualization: A visual representation of spatial information pertaining to Earth.

Geospatial: Containing properties related to spatial information relative to Earth.

Spatial Information: Data which is associated with any type of coordinate information or a coordinate itself.

Visualization Machine: An computation entity used to define and describe the geovisual capabilities required to generate any geovisualization described by a valid AGL program.

Visualization Program: A program that takes data as input and renders the result in the form of pictures and other information rather than merely text.

Visualization Adapter: A program that purports to be a visualization machine and maps the required abstract capabilities onto the specific actual capabilities of real visualization programs.

Visualizer: A program or environment capable of creating visual representations of information.

The instant disclosure describes various embodiments of methods and systems for interacting with one or more geospatial data servers. In fact, more than one geospatial data server and other external data sources may be queried concurrently to present a geovisual representation in response to the single query. While the embodiments below describe coordinate space in the context of the planet Earth, it should be noted that the following disclosure is applicable to any theoretical space (e.g., another planet or a subset of Earth's real space, e.g., a city or a server room relative to a corporate computer network).

In one embodiment, an AGL interpretation layer provides a capability within the data injection frameworks of one or more geovisualization applications for new predicates to be created and applied unpredictably at runtime thereby allowing a user to produce the desired view without having to restart a user session or re-enter the entire and possibly complex query. In another embodiment, an AGL interpreter can simultaneously translate a user request for information into the proper data injection technique of more than one geovisualization application and render the result of a single request in both applications. In yet another embodiment, the AGL interpreter can interact with other data processing capabilities such as, but not limited to, external web pages, web services, simulation engines, and database repositories.

A single AGL expression could be deployed across each of the supported geovisualization environments simultaneously. Thus, AGL interpretation provides a "write once, render anywhere" capability.

Referring now to FIG. 1, a system 100 is shown in which an example AGL session may be implemented. Input from a user (121) at an input and visualization device (120) or a user initiated application (not shown) is received at block 110. Translation engine (130) performs the interpretation process 200, described below, and possibly other processing. Translation Engine (130) may reference internal data (131) or request other informational data (e.g., across a network) from an external data source (140). This external data source may include informational data, such as, an FAA web page listing flight delays for a particular region or airport. After translation, the user query is sent to one or more geospatial data servers (150 and 160) which return a visual result to the display of the user input and visualization station (120). Note that each of the one or more geospatial data servers (150 and 160) may require one or more particular visualization adapters (135 or 136) which act in an analogous manner to a plug-in for a web browser (i.e., they translate a common formatted input into the format required for a particular geospatial data server). Also note that, the result may be displayed on a separate visualization device from where the user (121) input the request, as shown with display 125.

Further, explaining by way of a non limiting example with example pseudo code for explanatory purposes, system 100 may be used by a marketing team to investigate the performance of a particular advertisement and sales campaign. Consider a retail store wanting to determine if an expansion in a billboard advertisement program is required, and if so, the actual location to place more billboards. As each patron pays their bill, the cashier requests the patron's phone number. The phone number may also be indexed against a reverse phone directory to determine the home address of each patron. The phone number, home address, and purchase data information may be stored in a data store such as a database (e.g., external data source 140).

The AGL user 121 may later query the system 100 and obtain a geovisual plot of all locations that generated a purchase and the locations of existing billboards.

```
>import agl.lang;
>import sales.salesDB;
>import marketing.bboardDB;
>var juneSalesTX=new SalesByRegionMonth("Texas", Months.JUNE);
>var juneBillboardLocations=new BillboardPlacements ("Texas", Months.JUNE);
>SHOW customerHomeAddress FROM juneSalesTX WITH BLUE;
>SHOW FROM juneBillboardLocations WITH RED;
```

This geovisual plot may provide much more intuitive information than a tabular representation of the same data. This is because the user will be able to visualize on the surface of the earth the actual locations of purchasing customers relative to existing billboards. Using dynamic predicates this user may then refine the geovisual plot with an analytical filter to display a pie chart for each zip code representing the percentage of purchases over a certain dollar amount.

```
>var customerZipsTXDistinct=new Set<Zip>(SELECT customerHomeAddress.ZipCode FROM juneSalesTX);
>foreach(Zip z in customerZipsTXDistinct) Chart (COUNT FROM juneSalesTX WHERE customerHomeAddress.ZipCode=z AND invoiceAmount>50.00, COUNT FROM juneSalesTX WHERE customerHomeAddress.ZipCode=z, z);
```

Next, the user may further refine the geovisual plot to display a median location based on both zip codes and dollar amounts to determine a preferred location for the next billboard or alternatively determine that some billboards are not generating any sales.

```
>Set<Zip>zipsAboveFifty=new Set<Zip>(SELECT customerHomeAddress.ZipCode FROM juneSalesTX WHERE invoiceAmount>50.00);
>PLOT MedianLocation(zipsAboveFifty) WITH GREEN;
```

If the median location is determined to be too close to an existing billboard location the user may restrict the data to exclude all purchases from a particular area to knowingly alter the median by changing a single set of input data while keeping all other available data in an unbiased manner.

```
>HIDE GREEN;
>Set<Zip>zipsAboveFifty2=new Set<Zip>(SELECT customerHomeAddress.ZipCode FROM juneSalesTX WHERE invoiceAmmount>50.00 AND customerHomeAddress.ZipCode< >77030);
>PLOT MedianLocation(zipsAboveFifty2) WITH ORANGE;
```

Furthermore, all of these steps may be performed in a single user session utilizing dynamic predicates. The results are displayed to a user in a geospatial context. Thus, these results may be more intuitive regarding both refinement decisions and determining where the best potential location of a new billboard might be.

Figure 2:
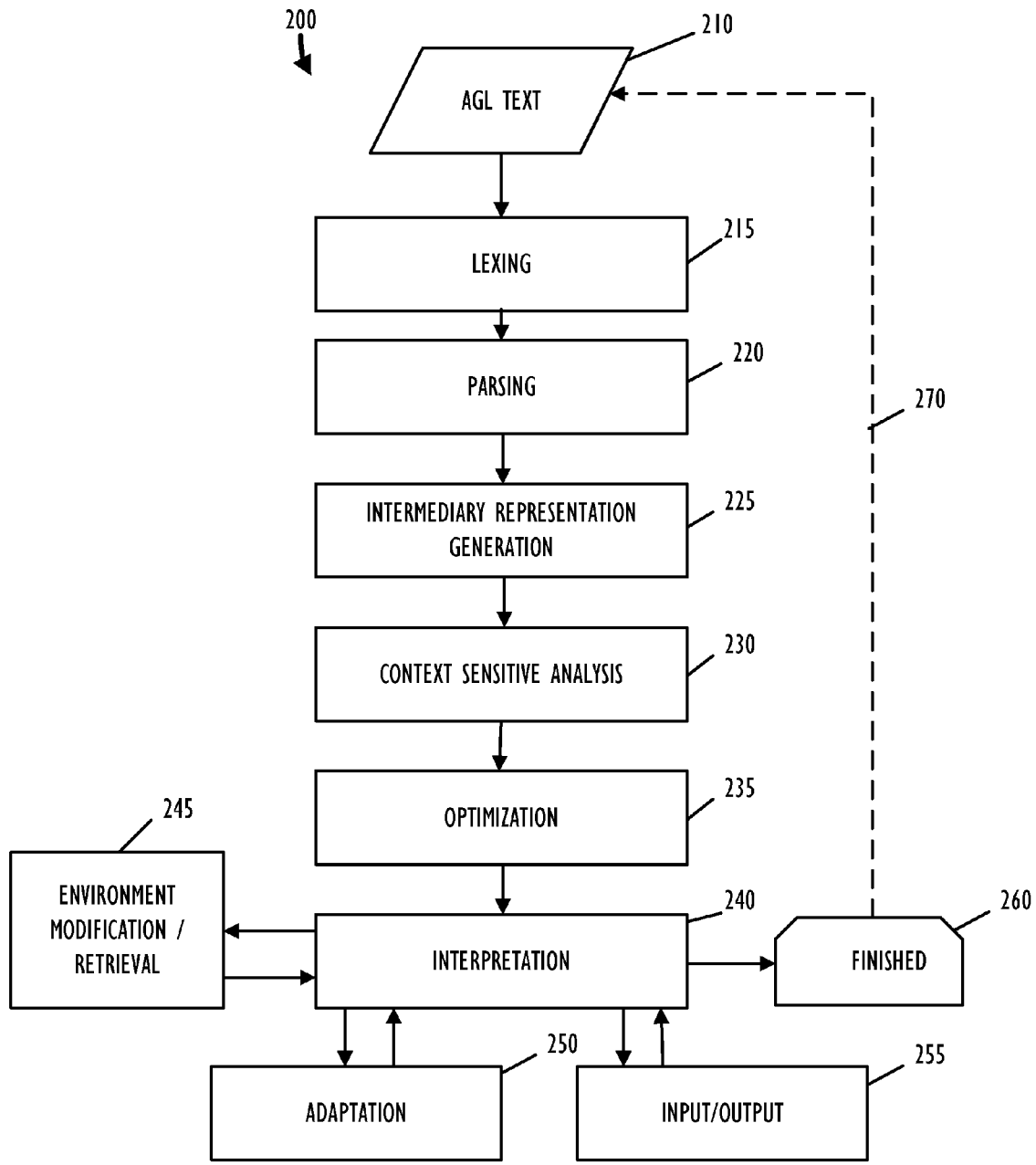
FIG. 2 shows, in flowchart form, an illustrative process from user input to data representation.

Referring now to FIG. 2 a diagram of process (200) is shown to generally describe the acts performed by the "translation engine" when processing a user's query. Process 200 is described based on an embodiment utilizing an interpretation technique for clarity. However, it should be understood that other techniques generally known to those of skill in the art (e.g., source to source compilation, cross compilation, etc. could also be used). Furthermore, these other techniques can also be considered a special case of the more general interpretation technique.

Process 200 is an iterative process. That is, for a single visualization result to be rendered for presentation to a user several iterations of process 200 may be required. The iterative nature is shown by the dotted line (270) connecting the termination point (260) to the starting point (210) of process 200. The number of iterations may be dependent upon how a user structures the AGL program text (210). For a given visualization it may be possible for a user to describe the entire visualization in one "hunk" of AGL text represented at the start of the program or a user may elect to describe the visualization using several distinct "hunks" of program text that are fed sequentially to the translation engine to converge upon a visualization.

Process 200 begins with block 210 when the AGL text program (or program hunk) that is given to the translation engine as input from a user. Next, at block 215, Lexing is performed. Lexing is the process of carving the program text into individual words (called lexemes) and establishing each lexeme's roles within the text. Lexing is somewhat similar to diagramming a sentence from a natural language. Next, flow continues to block 220 where parsing is performed. Parsing is the process of examining the lexemes and ensuring they conform to the grammar of the AGL language (formally, the context free grammar). Next, flow continues to block 225 to generate an intermediary representation. This is the process of changing the input from a text oriented representation into a more data structure driven representation in order to make computational analysis and interpretation easier.

After the intermediary representation has been generated, a context sensitive analysis is performed at block 230. This is the process of verifying that the semantics of the program are logical. For example, there are many grammatically valid English sentences that are nonsensical, e.g. "The dog bit his wing." Grammatically valid, but illogical since dogs do not have wings. The goal of context sensitive analysis (CSA) is to detect similar types of errors in program text—for example invoking a three argument function but only passing two arguments.

At block 235 optimization may be performed. Optimization is the process of transforming the intermediary representation into a new semantically equivalent intermediary representation that is in some way more desirable than the former representation.

Interpretation is performed at block 240 and is the process of examining the program in intermediary representation form and computing the result of that program. During interpretation, zero or more of the sub processes of blocks 245, 250 or 255 may occur. Block 245 represents "Environmental Modification/Retrieval" which is the process of representing and retrieving the state of an ongoing program. This state may influence the result of the current program hunk or future program hunks. For example, if the AGL program hunk where "Num j=3;" this is the part of the system that tracks the assignment of j to three and also provides the value of j to future uses of j in the current or upcoming program hunks. Block 250 represents "Adaptation" which is the process of outputting a visualization element to one of the "geospatial data servers." In the example of NASA World Wind this could be the act of drawing a point or line on the screen, or in the case of Google Maps, adding a new line of JavaScript code to a file on disk. Block 255 represents "Input/Output" which is the process of showing non visualization results, e.g. textual components, to a user or other types of interaction such as but not limited to, user interaction, web services requests, socket connections, etc. After interpretation is completed flow continues to block 260 where another iteration may be performed.

AGL may also be used to provide for persistent queries where the visualization is updated periodically either via a timer or based on changes in the underlying data. AGL may further be used to provide delta visualization of data changes between different points in time. AGL may still further be used to provide analytical capability such as rendering of a pie chart or histogram associated with the geospatial data being visualized, derived from geospatial data or data generated by the environment itself.

The description above is presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein. Also, the foregoing examples have been presented in the context of a human generating the dynamic queries allowed within AGL. It is also possible for a computer program to utilize this same dynamic interface.

One of skill in the art, given the benefit of this disclosure, will recognize that the inventive nature of this disclosure is not limited to the airline industry. Other examples of industries and uses include but are not limited to: marketing where AGL could study the effectiveness of advertising campaigns in different geographies; environmental impact monitoring where AGL could visualize which operational centers are impacted by a weather event; health monitoring where AGL could be used to visualize health impacts based on pollution reports or clinical diagnostic reports; travel by providing visualization of regional content (e.g., all gas stations within 15 miles with unleaded less than $3.90); realty where AGL could visualize house searching information based on purchase criteria; etc.

Various changes in the details of the illustrated operational methods are possible without departing from the scope of the following claims. For instance, illustrative interpretation process 200 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 1 and 2 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices for persistently storing information, sometimes referred to as computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A method of interpreting a geospatial query comprising:
   accepting a user input, requesting geospatial information, from a user interface configured to accept dynamic predicates;
   translating the user input into intermediate data acceptable to one or more geoserver applications, wherein the user input comprises at least one dynamic predicate;
   sending at least a portion of the intermediate data to the one or more geoserver applications;
   obtaining a result returned from the one or more geoserver applications; and
   rendering a geospatial image of the result for presentation to an end user.

2. The method of claim 1 further comprising processing the result returned from the one or more geoserver applications prior to rendering the geospatial image.

3. The method of claim 1 further comprising storing the intermediate data to persistent storage prior to sending the intermediate data to the one or more geoservers.

4. The method of claim 3 further comprising:
   embedding at least a portion of the intermediate data stored to persistent storage into a first application;
   executing the first application; and
   rendering a geospatial image of the result to an end user.

5. The method of claim 1 wherein sending at least a portion of the intermediate data includes sending one or more portions of the intermediate data to multiple geoservers.

6. The method of claim 1 further comprising:
   sending at least a portion of the intermediate data to an external data source; and
   retrieving a result from the external data source and processing that result prior to sending at least a portion of the processed result to the one or more geoservers.

7. The method of claim 6 further comprising:
   maintaining internal data for use in processing the result retrieved from the external data source prior to sending at least a portion of the processed result to the one or more geoservers.

8. The method of claim 1 further comprising allowing the user to refine the user input within a same user session.

9. The method of claim 1 wherein rendering is performed to a remote user display device.

10. A method of interpreting input data within a geovisualization environment comprising:
    accepting input data containing dynamic predicates;
    translating the input data into a query format and language required by one or more geospatial data servers;
    querying the one or more geospatial data servers with at least a portion of the translated input data; and
    rendering the result of the query to a user display device.

11. The method of claim 10 further comprising allowing the user to refine the input data within a same user session.

12. The method of claim 10 wherein querying the one or more geospatial data servers with at least a portion of the translated input data includes sending one or more portions of the data to multiple geoserver applications.

13. The method of claim 10 wherein rendering is performed to a remote display device.

14. The method of claim 10 further comprising:
    sending at least a portion of the translated input data to an external data source; and
    retrieving a result from the external data source and processing that result prior to querying the one or more geospatial data servers with at least a portion of the translated input data.

15. The method of claim 14 further comprising maintaining internal data for use in processing the result retrieved from the external data source prior to sending at least a portion of the processed result to the one or more geoserver applications.

16. The method of claim 10 further comprising embedding translated input data into an application prior to querying and later executing the application to initiate the query.

17. The method of claim 11 further comprising translating only the refined portion of the input data.

18. A computer storage device containing instructions stored thereon to instruct a processor to perform the method of:
    accepting a user input, requesting geospatial information, from a user interface configured to accept dynamic predicates;
    translating the user input into intermediate data acceptable to one or more geoserver applications;
    sending at least a portion of the intermediate data to the one or more geoservers;

obtaining a result returned from the one or more geoservers; and rendering a geospatial image of the result for presentation to an end user.

19. A computer readable medium containing instructions stored thereon to instruct a processor to perform the method of:

accepting input data containing dynamic predicates;

translating the input data into a query format and language required by one or more geospatial data servers;

querying the one or more geospatial data servers with at least a portion of the translated input data to obtain a result; and rendering the result of the query to a user display device.

20. A computer system comprising:

a programmable processing unit;

one or more display devices communicatively coupled to the programmable processing unit;

a network communication device communicatively coupled to the programmable processing unit; and a user input coupled to the programmable processing unit;

wherein the programmable processing unit is configured to:

accept a user input, requesting geospatial information, from a user interface configured to accept dynamic predicates;

translate the user input into intermediate data acceptable to one or more geoserver applications, wherein the user input comprises at least one dynamic predicate;

send at least a portion of the intermediate data to the one or more geoserver applications;

obtain a result returned from the one or more geoserver applications; and render a geospatial image of the result to an end user on the one or more display devices.

* * * * *